April 28, 1931.　　　　　G. ROOS　　　　　1,802,537
REFRIGERATING APPARATUS OF THE ABSORPTION TYPE
Filed Jan. 2, 1929
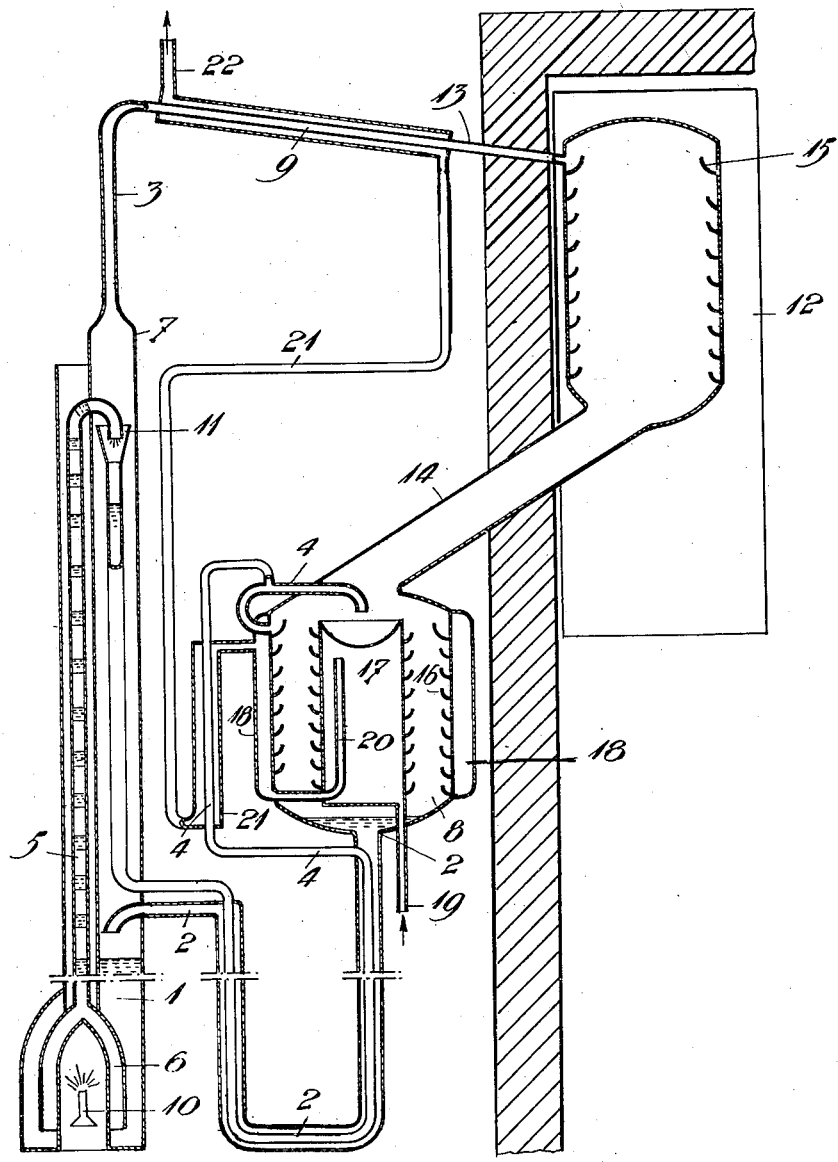
INVENTOR
Gunnar Roos
by
ATTORNEY Patented Apr. 28, 1931

1,802,537

UNITED STATES PATENT OFFICE

GUNNAR ROOS, OF STOCKHOLM, SWEDEN

REFRIGERATING APPARATUS OF THE ABSORPTION TYPE

Application filed January 2, 1929, Serial No. 329,874, and in Germany January 3, 1928.

The present invention relates to arrangements adapted to maintain the flow of the liquid in refrigerating apparatus of the absorption type, operating with an indifferent or auxiliary agent.

As well known, in order to maintain the circulation between the absorber and the boiler, the absorption liquid flowing into the boiler should be raised to a higher level than the surface of the liquid in the boiler. The arrangements, hitherto known, serving for this purpose, operate in the manner that the absorption liquid is raised or pressed out of the boiler through a pipe, through which not only the whole quantity of liquid but also the entire gas, expelled, should flow. Except the resistance thus produced there is, in such an arrangement, a drawback, namely that the absorption liquid contained in the boiler will not be deprived of gas in a satisfactory way, as it will leave the boiler already when the gas quantity, required for conveying the liquid, is expelled.

The invention is based upon the fact that only a portion of the gas quantity expelled from the liquid is utilized to raise the liquid, while the rest of the gas expelled from the liquid in the boiler, escapes without influencing the raising movement of the liquid. By this fact the raising movement of the liquid will be retarded, and as a result, the gas will be more completely expelled from the absorption liquid in the boiler.

By this more complete expelling of the gas, however, an increased efficiency of the refrigerating apparatus in question is obtained.

The annexed drawing shows an embodiment of the invention, namely a vertical section of a refrigerating apparatus of the absorption type, diagrammatically.

The boiler 1 contains the rich absorption liquid and is connected to the absorber 8 by a pipe 2. The lowest point of absorber 8 is above the level at which pipe 2 enters boiler 1 so that the absorption liquid will flow into said boiler by virtue of its own weight. A gas discharge pipe 3 leads to a condenser 9. A pipe 4 is vertically positioned within boiler 1 above the liquid level and is connected through branches to the absorber 8. The upper end of pipe 4 is above the level of the top of absorber 8 and the liquid will flow in said pipe 4 to the absorber 8.

To heat the liquid introduced into the boiler there may be used any suitable heater. The drawing shows an external heater consisting of a gas burner 10, indicated diagrammatically. It may be replaced by an electrical heater, the heating unit of which may be located within the boiler and surrounded by the liquid.

A vertical pipe 5, having both of its ends open, is utilized to raise the liquid in the boiler; the widened bottom end 6 of this pipe is submerged to the desired depth into the liquid contained in the boiler, the top end 7 being curved and extending in the enlarged funnel-shaped top end 11 of the pipe 4. The enlargement of the bottom end 6 of the pipe 5 is shaped so as to allow the mouth to occupy a considerable portion of the boiler cross-section.

In special cases the pipe 5 may at different points be given another cross-section and the depth to which the bottom end 6 is submerged in the liquid may be varied.

The evaporator 12 is, at its top, connected to the pipe 13 coming from the condenser 9 and, at its bottom, connected to the absorber 8 by means of a pipe 14. The evaporator has its interior walls provided with flanges or baffle plates 15 so as to cause the liquid flowing from the condenser, to flow down along the walls of the evaporator, slowly and uniformly dispersed.

To distribute the absorption liquid in the absorber similar flanges 16 may be arranged along the walls of the absorber. In order to obtain a maximum dispersion of the weak absorption liquid in the absorber, this is provided with an additional container or pot 17 provided with flanges 16. In order to accelerate the absorption of the gas in the absorption liquid the absorber, it is water-cooled. The cooling water is conveyed through said pot 17 as well as round the walls of the absorber. For this purpose the absorber is surrounded by a casing 18. The cooling water is introduced at the bottom end of the pot 17 through the supply pipe 19 and is discharged at the top end through the pipe 20, opening into the casing 18. From this place it is conveyed through the pipe 21 to the condenser 9 and finally discharged through the outlet 22.

In order to further cool the weak absorption liquid, the pipe 4 may be surrounded by a portion of the pipe 21 and by the pipe 2 coming from the absorber and going to the boiler, and as a result the hot, weak absorption liquid which flows in the pipe 4 delivers a portion of its heat to the colder absorption liquid, which is richer in gas and flowing in the opposite direction.

The apparatus operates in the following manner:

The absorption liquid flowing into the boiler is heated by the burner 10; thus, the gas will be expelled. A portion of the expelled gas is separated at the surface of the liquid and flows alone through the top part of the boiler into the pipe 3, while another portion of the gas, which is expelled in the funnel-shaped bottom end 6 of the pipe 5, flows up through the pipe 5 and carries liquid with it, which is delivered, at the top end of the pipe 5, into the pipe 4, the gas being separated at this point from the liquid and escaping together with the other gas portion through the pipe 3.

The boiler and the pipe 5 may be constructed in a way differing from that shown in the drawing, further, instead of one pipe 5, several pipes may be used, for instance when the shaping of the boiler requires such steps to be taken. It may be advantageous to use several narrow pipes instead of a wide one. In this event the more narrow pipes may issue from a common funnel emerged into the liquid, or from a similar chamber.

Instead of arranging the pipe 5 in the way shown it may also open into a container or bowl communicating with the pipe 4, if the gas flowing up through the pipe gets opportunity of being separated from the liquid and escaping through the pipe 3 to the condenser.

By the influence of the cooling water the gas will be condensed in the condenser to a liquid state. The liquid will then flow to the evaporator or cooler 12. In this cooler it is delivered to the top flange 15; after this it flows slowly and uniformly dispersed along the walls of the cooler 12 at the same time being evaporated, thus cooling the walls of the evaporator 12.

The gas produced flows through the pipe 14 into the absorber 8. The conveying of the gasified cooling agent from the evaporator or cooler 12 to the absorber 8 is effected by diffusion into the indifferent gas or agent, for instance hydrogen or by any other physical course.

The gasified cooling gas comes in the absorber in contact with the weak absorption liquid, introduced through the pipe 4, and is dissolved therein, delivering heat, which is removed continuously by the cooling water. The rich absorption liquid will gather in the bottom part of the absorber 8 and is siphoned back to the boiler by the pipe 2; the gas will then once more be expelled from the absorption liquid.

Preferably water is used for the absorption liquid, ammonia for the cooling gas and air or hydrogen as the indifferent agent, however, other liquids and gases may be used and such use is within the scope of the present invention.

Having now particularly described the nature of my invention and the manner of its operation, what I claim is:

1. Refrigerating apparatus of the absorption type comprising a boiler containing absorption liquid and a rising pipe, collecting means positioned below the liquid level of said boiler connected to said rising pipe and adapted to collect only a portion of the gas expelled from said absorption liquid, a condenser and an evaporator receiving, liquefying and gasifying all of the gas in said boiler, an absorber connected to said evaporator and positioned above the liquid level of said boiler, a pipe connected to said absorber and entering said boiler and a second pipe in said boiler receiving the weak absorption liquid from the first mentioned rising pipe and conducting the same to said absorber.

2. Refrigerating apparatus of the absorption type comprising a boiler containing absorption liquid and a rising pipe, funnel-shaped collecting means positioned below the liquid level of said boiler connected to said rising pipe and adapted to collect only a portion of the gas expelled from said absorption liquid, a condenser and an evaporator receiving, liquefying and gasifying all of the gas in said boiler, an absorber connected to said evaporator and positioned above the liquid level of said boiler, a pipe connected to said absorber and entering said boiler and a second pipe in said boiler receiving the weak absorption liquid from the first mentioned rising pipe and conducting the same to said absorber.

GUNNAR ROOS.